United States Patent
Byun et al.

(12)

(10) Patent No.: US 6,741,322 B2
(45) Date of Patent: May 25, 2004

(54) PRODUCTION LINE OF LIQUID CRYSTAL DISPLAY DEVICE HAVING SHIELD OF UV BLOCKING MATERIAL

(75) Inventors: Yong Sang Byun, Kumi (KR); Moo Yeol Park, Taegu-kwangyokshi (KR); Sung Su Jung, Taegu-kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 47 days.

(21) Appl. No.: 10/265,263

(22) Filed: Oct. 7, 2002

(65) Prior Publication Data

US 2003/0169395 A1 Sep. 11, 2003

(30) Foreign Application Priority Data

Mar. 6, 2002 (KR) ........................... 2002-011922

(51) Int. Cl.[7] ............................................. G02F 1/1339
(52) U.S. Cl. .................. 349/190; 349/153; 349/187
(58) Field of Search ................. 349/153, 187, 349/190

(56) References Cited

U.S. PATENT DOCUMENTS

| | | | |
|---|---|---|---|
| 3,978,580 A | | 9/1976 | Leupp et al. |
| 4,094,058 A | | 6/1978 | Yasutake et al. |
| 4,333,715 A | * | 6/1982 | Brooks .................... 352/98 |
| 4,653,864 A | | 3/1987 | Baron et al. |
| 4,691,995 A | | 9/1987 | Yamazaki et al. |
| 4,775,225 A | | 10/1988 | Tsuboyama et al. |
| 4,952,925 A | * | 8/1990 | Haastert .................... 345/87 |
| 5,103,336 A | * | 4/1992 | Sieloff .................... 359/253 |
| 5,247,377 A | | 9/1993 | Omeis et al. |
| 5,263,888 A | | 11/1993 | Ishihara et al. |
| 5,379,139 A | | 1/1995 | Sato et al. |
| 5,406,989 A | | 4/1995 | Abe |
| 5,479,277 A | * | 12/1995 | Fergason .................... 349/86 |
| 5,499,128 A | | 3/1996 | Hasegawa et al. |
| 5,507,323 A | | 4/1996 | Abe |
| 5,511,591 A | | 4/1996 | Abe |
| 5,539,545 A | | 7/1996 | Shimizu et al. |
| 5,539,552 A | * | 7/1996 | Desai et al. ................. 349/104 |
| 5,548,429 A | | 8/1996 | Tsujita |
| 5,642,214 A | | 6/1997 | Ishii et al. |
| 5,680,189 A | | 10/1997 | Shimizu et al. |
| 5,742,370 A | | 4/1998 | Kim et al. |
| 5,757,451 A | | 5/1998 | Miyazaki et al. |
| 5,852,484 A | | 12/1998 | Inoue et al. |
| 5,854,664 A | | 12/1998 | Inoue et al. |
| 5,861,932 A | | 1/1999 | Inata et al. |
| 5,875,922 A | | 3/1999 | Chastine et al. |
| 5,952,678 A | | 9/1999 | Ashida |
| 5,956,112 A | | 9/1999 | Fujimori et al. |

(List continued on next page.)

FOREIGN PATENT DOCUMENTS

| | | |
|---|---|---|
| EP | 1003066 A1 | 5/2000 |
| JP | 51-065656 | 6/1976 |
| JP | 57038414 | 3/1982 |

(List continued on next page.)

Primary Examiner—Toan Ton
Assistant Examiner—Andrew Schechter
(74) Attorney, Agent, or Firm—McKenna Long & Aldridge LLP

(57) ABSTRACT

A production line for manufacture of a LCD device having a plurality of processing devices includes a production line shield being formed of a UV blocking material and positioned along a sealant forming device and an attaching device and between the sealant forming device and the attaching a device; and at least one work lamp that irradiates light in a band other than an ultraviolet band. A UV blocking lamp may be provided above the production line shield. Thus, a sealant is not prematurely hardened, so that the lower substrate is effectively bonded to the upper substrate, and a desired cell gap is maintained between the lower and upper substrates.

53 Claims, 5 Drawing Sheets

U.S. PATENT DOCUMENTS

| | | | |
|---|---|---|---|
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,128,056 A * | 10/2000 | Kubota et al. | 349/86 |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,313,894 B1 * | 11/2001 | Sekine et al. | 349/88 |
| 6,337,730 B1 | 1/2002 | Ozaki et al. | |
| 6,414,733 B1 | 7/2002 | Ishikawa et al. | |
| 2001/0021000 A1 | 9/2001 | Egami | |

FOREIGN PATENT DOCUMENTS

| | | |
|---|---|---|
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 05-154923 | 6/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |
| JP | 6160871 | 6/1994 |
| JP | 06-235925 | 8/1994 |
| JP | 06265915 | 9/1994 |
| JP | 06-313870 | 11/1994 |
| JP | 07-084268 | 3/1995 |
| JP | 07128674 | 5/1995 |
| JP | 07181507 | 7/1995 |
| JP | 08095066 | 4/1996 |
| JP | 08-101395 | 4/1996 |
| JP | 08106101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 09-061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-177178 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001117105 | 4/2001 |
| JP | 2001-117109 | 4/2001 |
| JP | 2001-133745 | 5/2001 |
| JP | 2001133794 | 5/2001 |
| JP | 2001-133799 | 5/2001 |
| JP | 2001142074 | 5/2001 |
| JP | 2001147437 | 5/2001 |
| JP | 2001154211 | 6/2001 |
| JP | 2001-166272 | 6/2001 |
| JP | 2001-166310 | 6/2001 |
| JP | 2001-183683 | 7/2001 |
| JP | 2001-209052 | 8/2001 |
| JP | 2001-222017 | 8/2001 |
| JP | 2001-235758 | 8/2001 |
| JP | 2001-215459 | 9/2001 |
| JP | 2001255542 | 9/2001 |
| JP | 2001264782 | 9/2001 |
| JP | 2001-201750 | 10/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001330840 | 11/2001 |
| JP | 2001-356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002080321 | 6/2002 |

| | | | | | |
|---|---|---|---|---|---|
| JP | 202214626 | 7/2002 | KR | 2000-0035302 A1 | 6/2000 |
| JP | 2002202512 | 7/2002 | | | |
| JP | 2002202514 | 7/2002 | * cited by examiner | | |

PRODUCTION LINE OF LIQUID CRYSTAL DISPLAY DEVICE HAVING SHIELD OF UV BLOCKING MATERIAL

This application claims the benefit of the Korean Application No. P2002-11922 filed on Mar. 6, 2002, which is hereby incorporated by reference for all purposes as if fully set forth herein. This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME" as if fully set forth herein

BACKGROUND OF THE INVENTION

1. Field of the Invention

The present invention relates to a production line for manufacturing a liquid crystal display (LCD) device, and more particularly, to a production line of an LCD device based on a liquid crystal dispensing method.

2. Discussion of the Related Art

Generally, ultra thin sized flat panel displays having a display screen with a thickness of several centimeters or less, and in particular, flat panel LCD devices, are widely used in monitors for notebook computers, spacecraft, and aircraft because such LCD devices have low power consumption because of a low driving voltage and are easy to carry.

Such LCD devices include a lower substrate, an upper substrate and a liquid crystal layer. A thin film transistor (TFT) and a pixel electrode are formed on the lower substrate. A light-shielding layer, a color filter layer and a common electrode are formed on the upper substrate, which is opposite to the lower substrate. Then, the liquid crystal layer is formed between the lower and upper substrates. In operation, an electric field is generated between the lower and upper substrates by the pixel and common electrodes, so that the alignment of molecules in the liquid crystal layer is driven by the electric field. Transmissivity of light through the liquid crystal layer is controlled with driving the liquid crystal layer, thereby displaying an image.

In manufacturing this LCD device, a vacuum injection method based on capillary phenomenon and pressure difference has been conventionally used to form the liquid crystal layer between lower and upper substrates. However, such a vacuum injection method has a problem in that it takes a long time to inject the liquid crystal due to the large sized display area, thereby reducing the productivity.

A liquid crystal dispensing method has been proposed to solve such a problem. A prior art method for manufacturing an LCD device based on the liquid crystal dispensing method will be explained with reference to FIG. 1A to FIG. 1D.

As illustrated in FIG. 1A, a lower substrate 1 and an upper substrate 3 are prepared. Although not shown in drawings, a plurality of gate and data lines are formed on the lower substrate 1. The gate lines cross the data lines to define pixel regions. A thin film transistor (TFT) is formed at each crossing point between the gate and data lines. A pixel electrode connected with the thin film transistor is formed in the pixel region.

A light-shielding layer is formed on the upper substrate 3 to prevent light from leaking out from the gate and data lines and the thin film transistor. Color filter layers of red(R), green(G), and blue(B) are formed on the light-shielding layer, and a common electrode is formed on the color filter layers. An alignment layer is formed on at least one of the lower substrate 1 and the upper substrate 3 to initially align molecules in a liquid crystal to be interposed between the upper and lower substrates 1 and 3.

As shown in FIG. 1B, a sealant 7 is formed on the lower substrate 1 and a liquid crystal 5 is dropped thereon, so that a liquid crystal layer is formed. A spacer (not shown) is spread onto the upper substrate 3 to maintain a cell gap between the upper and lower substrates 1 and 3.

In manufacturing an LCD device according to the vacuum injection method, the liquid crystal is injected between the substrates after bonding the substrates to each other. However, in manufacturing an LCD device according to the liquid crystal dispensing method, the lower and upper substrates 1,3 are bonded to each other after dispensing the liquid crystal 5 onto the substrates. Therefore, if a heat-hardening sealant is used as the sealant 7 in the LCD device according to the liquid crystal dispensing method, the sealant 7 may flow out of the substrate when it is heated. For this reason, a problem arises in that the liquid crystal 5 is contaminated. Accordingly, in the method of manufacturing the LCD based on the liquid crystal dispensing method, a UV-hardening sealant is used as the sealant 7 instead of a heat-hardening sealant.

Referring to FIG. 1C, the lower substrate 1 is attached to the upper substrate 3.

Referring to FIG. 1D, UV light is irradiated from a UV irradiating device 9 so that the sealant 7 is hardened, thereby bonding the lower substrate 1 and the upper substrate 3 to each other.

In manufacturing the LCD device based on the liquid crystal dispensing method, after attaching the lower substrate to the upper substrate, the sealant 7 formed on the lower substrate 1 is hardened in a UV irradiating process and the lower substrate 1 is bonded to the upper substrate 3. Accordingly, if the sealant formed on the lower substrate 1 is hardened before attaching the lower and upper substrates to each other, the lower substrate 1 is not bonded to the upper substrate 3 perfectly.

A production line of the LCD device based on the prior art liquid crystal dispensing method will be explained as follows.

First, the lower substrate having the TFT and the pixel electrode is loaded to a first loading device and then is moved to a sealant forming device and a liquid crystal dispensing device. Then the sealant and the liquid crystal layer are formed on the lower substrate. The upper substrate having the light-shielding layer, the color filter layer and the common electrode is loaded to a second loading device and is moved to a spacer scattering device, thereby forming a spacer on the upper substrate. The lower and upper substrates are moved to an attaching device and are attached to each other. After that, the attached substrates are moved to the UV irradiating device to harden the sealant, thereby bonding the lower and upper substrates to each other.

At this time, a cover is provided to an upper space of each device and a line between the devices. The cover is made of a transparent material for being watched by an operator. The top of the cover is opened so that dust generated during manufacturing the LCD device are discharged through the top of the cover. Also, a lamp is provided above the devices for manufacturing the LCD. If UV light is irradiated on the substrates through the cover and the upper space where the cover is not formed, the sealant may be hardened before arriving in the attaching device, so that the lower and upper substrates are not bonded perfectly.

SUMMARY OF THE INVENTION

Accordingly, the present invention is directed to a production line for manufacturing an LCD device that substantially obviates one or more problems due to limitations and disadvantages of the related art.

An advantage of the present invention is to provide a production line for the manufacture of an LCD device, in which a sealant is not hardened until arriving in an attaching device.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a production line of an LCD device according to the preferred embodiments of the present invention includes a production line shield being formed of a UV blocking material and positioned along a sealant forming device and an attaching device and between the sealant forming device and the attaching device; and at least one work lamp that irradiates light in a band other than an ultraviolet band.

If the work lamp is provided in the entire production line, the aforementioned problem is not generated. However, it has a problem in that an operator cannot watch process steps of a production line since the brightness of the work lamp is low.

Accordingly, in the production line according to the present invention, the work lamp is provided in an upper space from the sealant forming device to the attaching device, so that the UV light is not irradiated to a production line cover having an opened top.

In order to improve the brightness of the production line, an ordinary lamp is provided in the production line except for the UV blocking work lamp. Also, a production line cover of a UV blocking material is provided from the sealant forming device to the attaching device so as to prevent the UV light of the ordinary lamp from being irradiated to the sealant of the substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1A:
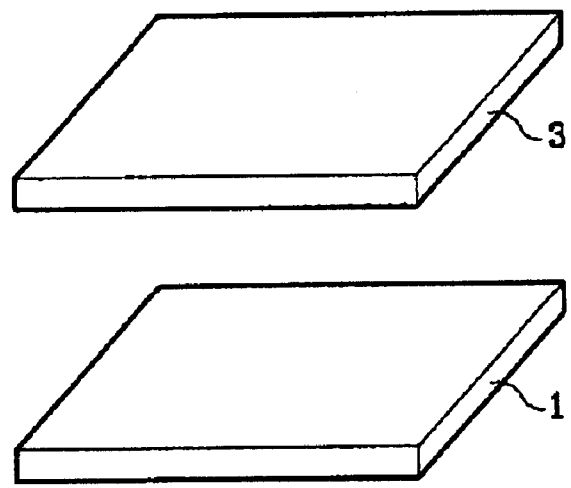
FIG. 1 illustrates a perspective view for showing manufacturing process steps of an LCD device according to a prior art liquid crystal dispensing method.
Figure 1B:
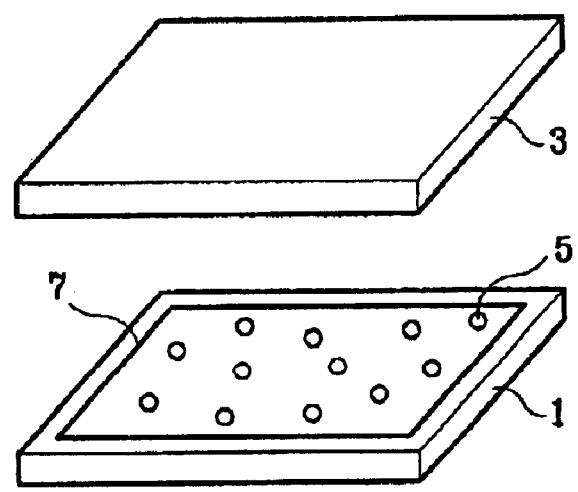
Figure 1C:
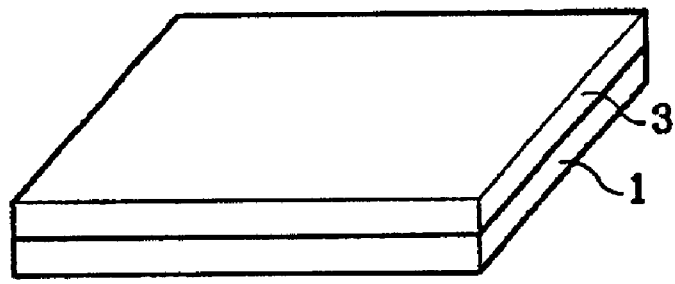
Figure 1D:
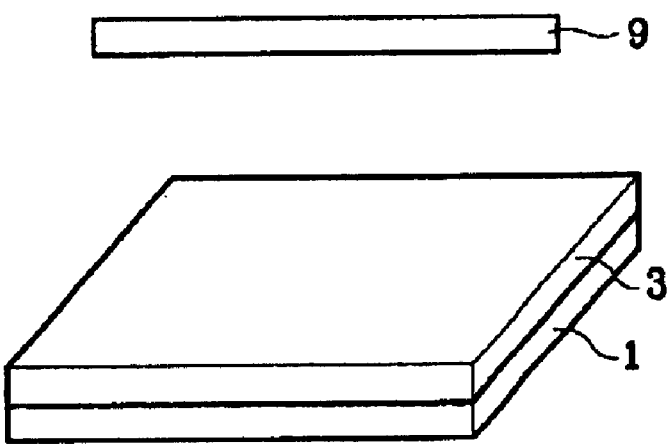
Figure 2:
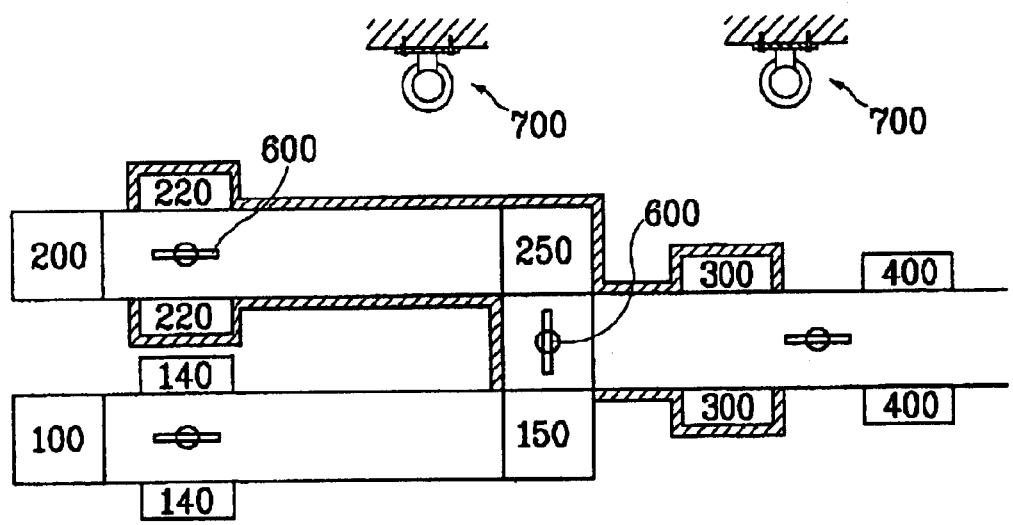
FIG. 2 illustrates a layout for showing a production line of an LCD device according to the first embodiment of the present invention.

FIG. 2 illustrates a layout of a production line of an LCD device according to the first embodiment of the present invention.

As shown in FIG. 2, a lower substrate having a thin film transistor (TFT) and a pixel electrode is loaded to a first loading device 100, and a liquid crystal layer is formed on the lower substrate in a liquid crystal dispensing device 140. Then, the lower substrate is loaded to a first buffer 150.

An upper substrate having a light-shielding layer, a color filter layer and a common electrode is loaded to a second loading device 200, and a sealant is formed on the upper substrate in a sealant forming device 220. Then, the upper substrate is loaded to a second buffer 250.

The lower and upper substrates are moved to an attaching device 300 and are attached to each other. After that, the substrates are moved to a UV irradiating device 400 so as to bond the substrates to each other by hardening the sealant.

In the sealant forming device 220, monomers or oligomers each having both ends coupled to acrylic group mixed with an initiator are used as the sealant; or, monomers or oligomers each having one end coupled to acrylic group and the other end coupled to epoxy group mixed with an initiator are used as the sealant. The epoxy group is not reactive with UV light irradiation. That is, heat must also be applied to the sealant to harden the sealant completely after irradiating the UV light onto the sealant. Accordingly, a heat-hardening device is additionally provided after the UV irradiating device 400.

Although not shown, a cell-cutting device and a testing device are additionally provided after the UV irradiating device 400 or the heat-hardening device. In the aforementioned production line, the substrates are moved by robot operating system 600.

At this time, the devices between the sealant forming device 220 and the attaching device 300 are covered with a production line cover (as indicated by slanted lines) of UV blocking material. Preferably, the production line cover is made of UV blocking acryl. Also, work lamp 700 that does not radiate UV light is provided above the devices in a region from the sealant forming device 220 to the attaching device 300.

Although not shown, a spacer forming device may be additionally provided between the sealant forming device 220 and the attaching device 250 for forming a ball spacer.

If particles exist in the sealant, it is difficult to bond the lower and upper substrates perfectly to each other. Accordingly, although not shown, a cleaning device should be additionally provided between the sealant forming device 220 and the attaching device 250.

The liquid crystal may be dispensed on the lower or the upper substrate. If the liquid crystal is dispensed on the upper substrate, the liquid crystal dispensing device 140 may be provided after or before the sealant forming device 220. Also, if the liquid crystal dispensing device 140 is provided after the sealant forming device 220, the corresponding production line cover is made of UV blocking material.

For reference, a method forming the sealant is divided into a screen printing method and a dispensing method. In the screen printing method, since a screen contacts the substrate, the alignment layer formed on the substrate may be damaged. Also, with a trend toward the large-sized LCD device, the sealant is used in great quantities, so that it is useful to form the sealant by the dispensing method. Accordingly, the aforementioned sealant deposition device 220 may be a screen printing or dispensing device. However, examples given herein refer to a dispensing device.

Figure 3:
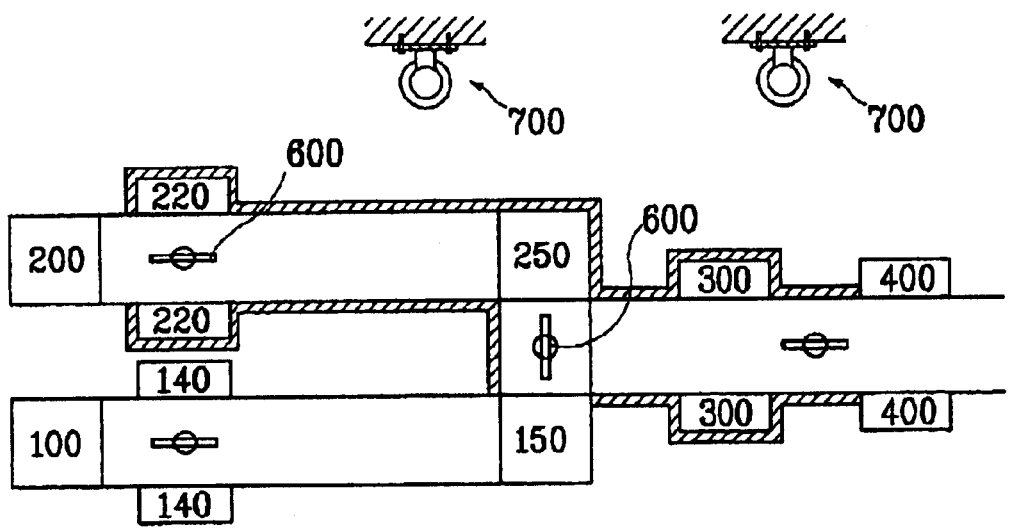
FIG. 3 illustrates a layout for showing a production line of an LCD device the second embodiment of the present invention.

FIG. 3 illustrates a layout for showing a production line of an LCD device according to the second embodiment of the present invention. The production line according to the second embodiment of the present invention is same as that according to the first embodiment of the present invention except that the production line cover of the UV blocking material is further provided above the devices between the attaching device and the UV irradiating device, as well as above the devices from the sealant forming device to the attaching device. Wherever possible, the same reference numbers will be used throughout the drawings to refer to the same or like parts.

When the lower substrate having the liquid crystal layer is attached to the upper substrate having the sealant, the liquid crystal is contaminated if the liquid crystal comes into contact with the sealant. Accordingly, relatively more liquid crystal is dispensed in the center of the lower substrate, and then is gradually spread onto the entire substrate. After the liquid crystal is spread onto the entire substrate at a constant level, a constant cell gap is maintained. In this state, the UV light has to be irradiated onto the substrate. If the sealant is hardened before irradiating the UV onto the substrate, it is impossible to form a desired cell gap.

Referring to FIG. 3, the production line cover for covering the devices from the attaching device 300 to the UV irradiating device 400 is made of UV blocking material such as UV blocking acryl. Also, a work lamp 700 provided above the aforementioned devices does not radiate UV light.

Figure 4:
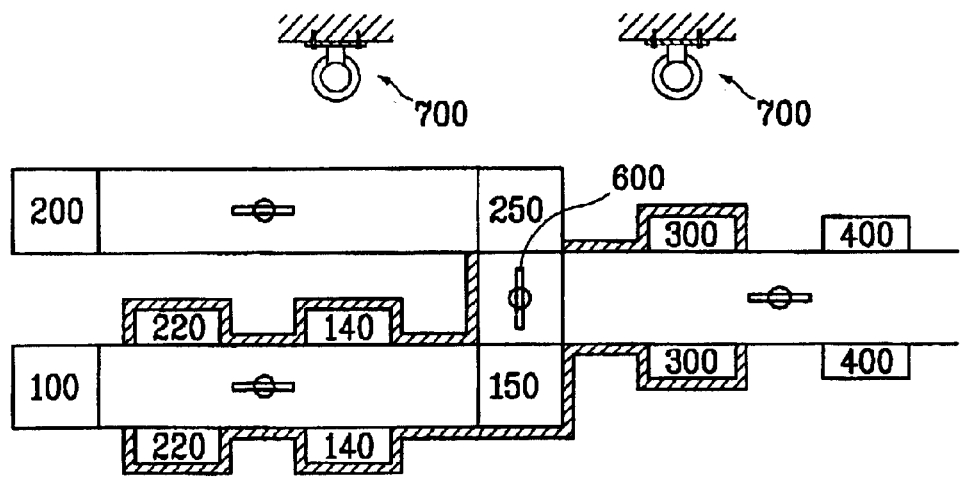
FIG. 4 illustrates a layout for showing a production line of an LCD device according to the third embodiment of the present invention.

FIG. 4 illustrates the production line according to the third embodiment of the present invention. As shown in FIG. 4, a lower substrate having a thin film transistor and a pixel electrode is loaded to a first loading device 100. A sealant is formed on the lower substrate in a sealant forming device 200, and a liquid crystal layer is formed on the sealant of the lower substrate in a liquid crystal dispensing device 140. After that, the lower substrate having the sealant and the liquid crystal layer is loaded to a first buffer 150.

An upper substrate having a light-shielding layer, a color filter layer and a common electrode is loaded to a second loading device 200, and then is loaded to a second buffer 250. At this time, a spacer forming device may be additionally provided between the second loading device 200 and the second buffer 250.

The lower and upper substrates are attached to each other in the attaching device 300, and then are hardened by hardening the sealant with the UV irradiating device 400.

At this time, devices from a sealant forming device 220 to the attaching device 300 are covered with a production line cover (slanted lines). The cover is made of UV blocking material such as UV blocking acryl.

A work lamp 700 that does not radiate UV light is provided in an upper space from the sealant forming device 220 to the attaching device 300.

Although not shown, a spacer forming device may be additionally provided between the sealant forming device 220 and the attaching device 300. (In this case, the spacer forming device is not provided between the aforementioned second loading device 200 and the second buffer 250.) Also, silver (Ag) forming device may be additionally provided between the sealant forming device 220 and the attaching device 300 for applying a voltage to a common electrode of the upper substrate. Preferably, the silver (Ag) is deposited in a dispensing method, and the Ag forming device is a dispensing device.

Figure 5:
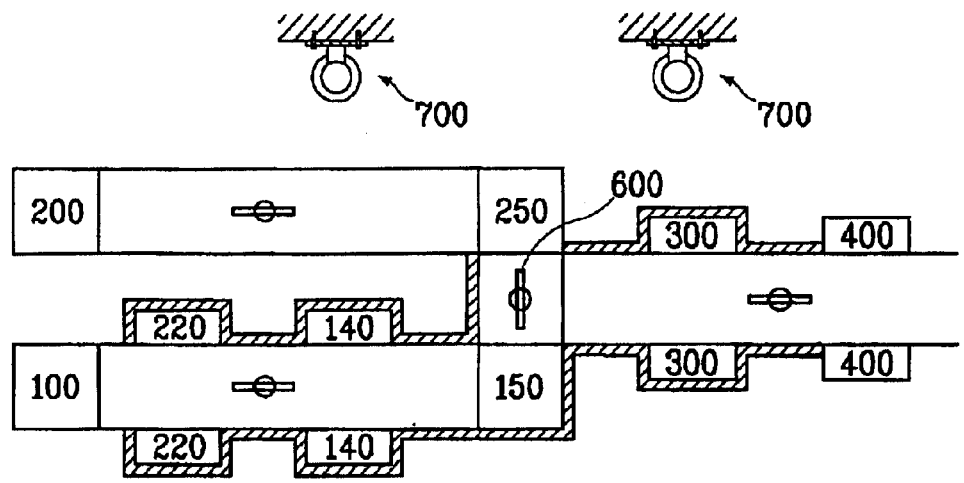
FIG. 5 illustrates a layout for showing a production line of an LCD device according to the fourth embodiment of the present invention.

FIG. 5 illustrates a layout for showing a production line of an LCD device according to the fourth embodiment of the present invention.

An LCD device according to the fourth embodiment of the present invention is same as the third embodiment except that production line cover of UV blocking material is further provided from an attaching device 300 to a UV irradiating device 400, and a work lamp 700 that does not radiate UV light is further provided above the production line cover.

Figure 6:
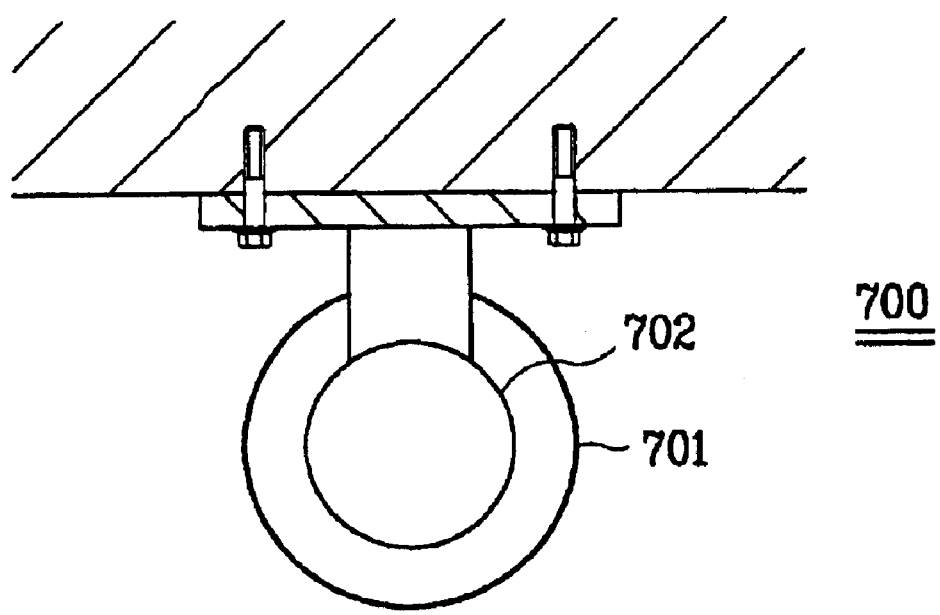
FIG. 6 illustrates an exemplary work lamp according to the present invention.

FIG. 6 illustrates an exemplary work lamp 700 that does not radiate UV light. As shown in FIG. 6, one embodiment of a work lamp 700 that does not radiate UV light includes a light source 702. The light source 702 may actually irradiate light in a spectrum including ultraviolet light. To prevent the ultraviolet light from being radiated onto the production, an ultraviolet light shield 701 is provided to surround the light source 702 to block UV light from being irradiated. The UV light shield 701 may be made of UV blocking as UV blocking acryl.

As mentioned above, the production line according to the preferred embodiments of the present invention has the following advantages.

The production line cover for covering the devices from the sealant forming device to be attaching device is made of UV blocking material, and the work lamp that does not radiate UV light is provided in the upper space from the sealant forming device 220 to the attaching device 300. Accordingly, the sealant is not hardened before attaching the substrates, so that the lower substrate is perfectly bonded to the upper substrate. Also, the sealant is not hardened until arriving the UV irradiating device, so that the desired cell gap is maintained.

It will be apparent to those skilled in the art that various modifications and variations can be made in the present invention. Thus, it is intended that the present invention covers the, modifications and variations of this invention provided they come within the scope of the appended claims and their equivalents.

What is claimed is:

1. A production line of an LCD device, the production line having a plurality of processing devices, comprising:
   a production line shield being formed of a UV blocking material and positioned along a sealant forming device and an attaching device and between the sealant forming device and the attaching device; and
   at least one work lamp that does not radiate ultraviolet light.

2. The production line as claimed in claim 1, wherein the at least one work lamp is located in a region from the sealant forming device to the attaching device.

3. The production line as claimed in claim 1, wherein the at least one work lamp includes a light source and an ultraviolet light shield.

4. The production line as claimed in claim 3, wherein the ultraviolet light shield includes an acryl.

5. The production line as claimed in claim 1, wherein the at least one work lamp includes a light source and a light shield, wherein the light shield blocks light having a wavelength less than about 600 nm.

6. The production line as claimed in claim 1, wherein the UV blocking material includes an acryl.

7. The production line as claimed in claim 1, further comprising a spacer forming device between the sealant forming device and the attaching device.

8. The production line as claimed in claim 1, further comprising a liquid crystal dispensing device between the sealant forming device and the attaching device.

9. The production line as claimed in claim 8, wherein the production line shield is along the liquid crystal dispensing device.

10. The production line as claimed in claim 8, wherein the production line shield is over the liquid crystal dispensing device.

11. The production line as claimed in claim 1, wherein the production line includes a first processing line and a second processing, wherein the first processing line includes the sealant forming device and the second processing includes a liquid crystal dispensing device.

12. The production line as claimed in claim 1, further comprising a silver (Ag) forming device between the sealant forming device and the attaching device.

13. The production line as claimed in claim 1, further comprising a cleaning device between the sealant forming device and the attaching device.

14. The production line as claimed in claim 1, further comprising a heat-hardening device after the UV irradiating device.

15. The production line as claimed in claim 1, wherein the production line shield is over the sealant forming device and the attaching device and between the sealant forming device and the attaching device.

16. The production line as claimed in claim 15, wherein the at least one work lamp is located in a region from the sealant forming device to the attaching device.

17. The production line as claimed in claim 15, wherein the at least one work lamp includes a light source and an ultraviolet light shield.

18. The production line as claimed in claim 17, wherein the ultraviolet light shield includes an acryl.

19. The production line as claimed in claim 15, wherein the at least one work lamp includes a light source and a light shield, wherein the light shield blocks light having a wavelength less than about 600 nm.

20. The production line as claimed in claim 15, wherein the UV blocking material includes an acryl.

21. The production line as claimed in claim 15, further comprising a spacer forming device between the sealant forming device and the attaching device.

22. The production line as claimed in claim 15, further comprising a liquid crystal dispensing device between the sealant forming device and the attaching device.

23. The production line as claimed in claim 22, wherein the production line shield is along the liquid crystal dispensing device.

24. The production line as claimed in claim 22, wherein the production line shield is over the liquid crystal dispensing device.

25. The production line as claimed in claim 15, wherein the production line includes a first processing line and a second processing, wherein the first processing line includes the sealant forming device and the second processing includes a liquid crystal dispensing device.

26. The production line as claimed in claim 15, further comprising a silver (Ag) forming device between the sealant forming device and the attaching device.

27. The production line as claimed in claim 15, further comprising a cleaning device between the sealant forming device and the attaching device.

28. The production line as claimed in claim 15, further comprising a heat-hardening device after the UV irradiating device.

29. A production line of an LCD device, the production line having a plurality of processing devices, comprising:

a production line shield, the production line shield being formed of a UV blocking material and positioned along a sealant forming device and an UV irradiating device and between the sealant forming device and the UV irradiating device; and at least one work lamp that does not radiate ultraviolet light.

30. The production line as claimed in claim 29, wherein the at least one work lamp is located in a region from the sealant forming device to the UV irradiating device.

31. The production line as claimed in claim 29, wherein the at least one work lamp includes a light source and an ultraviolet light shield.

32. The production line as claimed in claim 31, wherein the ultraviolet light shield includes an acryl.

33. The production line as claimed in claim 29, wherein the at least one work lamp includes a light source and a light shield, wherein the light shield blocks light having a wavelength less than about 600 nm.

34. The production line as claimed in claim 29, wherein the UV blocking material includes an acryl.

35. The production line as claimed in claim 29, further comprising a spacer forming device between the sealant forming device and the UV irradiating device.

36. The production line as claimed in claim 29, further comprising a liquid crystal dispensing device between the sealant forming device and the UV irradiating device.

37. The production line as claimed in claim 36, wherein the production line shield is along the liquid crystal dispensing device.

38. The production line as claimed in claim 36, wherein the production line shield is over the liquid crystal dispensing device.

39. The production line as claimed in claim 29, wherein the production line includes a first processing line and a second processing, wherein the first processing line includes the sealant forming device and the second processing includes a liquid crystal dispensing device.

40. The production line as claimed in claim 29, further comprising a silver (Ag) forming device between the sealant forming device and the UV irradiating device.

41. The production line as claimed in claim 29, further comprising a cleaning device between the sealant forming device and the UV irradiating device.

42. The production line as claimed in claim 29, further comprising a heat-hardening device after the UV irradiating device.

43. The production line as claimed in claim 29, wherein the production line shield is over the sealant forming device and the UV irradiating device and between the sealant forming device and the UV irradiating device.

44. The production line as claimed in claim 43, wherein the at least one work lamp is located in a region from the sealant forming device to the UV irradiating device.

45. The production line as claimed in claim 43, wherein the at least one work lamp includes a light source and an ultraviolet light shield.

46. The production line as claimed in claim 45, wherein the ultraviolet light shield includes an acryl.

47. The production line as claimed in claim 43, wherein the at least one work lamp includes a light source and a light shield, wherein the light shield blocks light having a wavelength less than about 600 nm.

48. The production line as claimed in claim 43, wherein the UV blocking material includes an acryl.

49. The production line as claimed in claim 43, further comprising a spacer forming device between the sealant forming device and the UV irradiating device.

50. The production line as claimed in claim 43, further comprising a liquid crystal dispensing device between the sealant forming device and the UV irradiating device.

51. The production line as claimed in claim 43, further comprising a silver (Ag) forming device between the sealant forming device and the UV irradiating device.

52. The production line as claimed in claim 43, further comprising a cleaning device between the sealant forming device and the UV irradiating device.

53. The production line as claimed in claim 43, further comprising a heat-hardening device after the UV device.

* * * * *